US012096138B2

(12) United States Patent
Dierickx

(10) Patent No.: US 12,096,138 B2
(45) Date of Patent: Sep. 17, 2024

(54) QUASI-GLOBAL SHUTTER FOR IMAGE SENSORS

(71) Applicant: CAELESTE CVBA, Mechelen (BE)

(72) Inventor: Bart Dierickx, Edegem (BE)

(73) Assignee: CAELESTE CVBA, Mechelen (BE)

( * ) Notice: Subject to any disclaimer, the term of this patent is extended or adjusted under 35 U.S.C. 154(b) by 0 days.

(21) Appl. No.: 18/068,638

(22) Filed: Dec. 20, 2022

(65) Prior Publication Data

US 2024/0205555 A1 Jun. 20, 2024

(51) Int. Cl.
*H04N 25/50* (2023.01)
*H04N 23/95* (2023.01)
*H04N 25/76* (2023.01)
*H04N 25/767* (2023.01)
*H04N 25/78* (2023.01)
*H04N 25/616* (2023.01)

(52) U.S. Cl.
CPC .............. *H04N 25/50* (2023.01); *H04N 23/95* (2023.01); *H04N 25/767* (2023.01); *H04N 25/7795* (2023.01); *H04N 25/78* (2023.01); *H04N 25/616* (2023.01)

(58) Field of Classification Search
CPC ...... H04N 25/50; H04N 23/95; H04N 25/767; H04N 25/7795; H04N 25/78; H04N 25/616
See application file for complete search history.

(56) References Cited

U.S. PATENT DOCUMENTS

| | | | |
|---|---|---|---|
| 11,710,758 B2 * | 7/2023 | Goossens | H04N 25/531 |
| | | | 348/294 |
| 11,832,797 B2 * | 12/2023 | Ouyang | G02B 21/16 |
| 2013/0087683 A1 | 4/2013 | Mo et al. | |
| 2014/0009656 A1 * | 1/2014 | Oike | H04N 25/75 |
| | | | 348/308 |
| 2016/0205335 A1 | 7/2016 | Hiwada et al. | |
| 2016/0227138 A1 * | 8/2016 | Kozlowski | H01L 27/14609 |
| 2018/0191981 A1 | 7/2018 | Tanaka | |
| 2020/0244912 A1 | 7/2020 | Sakurai et al. | |

FOREIGN PATENT DOCUMENTS

JP 2018006991 A * 1/2018 ............. H04N 5/232

* cited by examiner

*Primary Examiner* — Nhan T Tran
(74) *Attorney, Agent, or Firm* — Workman Nydegger

(57) ABSTRACT

A solid-state image sensor with quasi-global shutter function and a method of operating the same. A row control unit of the image sensor is configured to determine exceptional pixel rows for which a pre-scheduled global exposure control pulse would fully or partially coincide with a sequentially applied readout control pulse that is selecting a number of pixel rows of the pixel array to be read out. The pre-scheduled global exposure control pulse is applied simultaneously to all but the exceptional pixel rows and delayed and/or advanced versions of the exposure control pulse are applied to the exceptional pixel rows.

18 Claims, 7 Drawing Sheets

QUASI-GLOBAL SHUTTER FOR IMAGE SENSORS

TECHNICAL FIELD

The present invention relates to the field of solid-state imaging devices, and more particularly to readout methods and readout circuits for image sensors.

BACKGROUND OF THE INVENTION

Conventional CMOS image sensors often implement a rolling shutter function in which pixel exposure and pixel readout operations are performed row-sequentially. The rolling shutter function allows the readout of a next image frame to start immediately after the readout of the current image frame has terminated. Several pixel rows can be selected concurrently for readout, which decreases the readout time of each image frame at the cost of adding more hardware to the readout circuits.

Document US2014/0009656 A1 discloses a solid-state imaging device which includes several signal lines per pixel column. In a pixel column, the pixels of each pixel group are connected to different signal lines. The pixel drive unit sequentially drives the pixels in the pixel group at shifted timings.

Document US2013/0087683 A1 discloses a method and apparatus implementing a multiple-row concurrent readout scheme for high-speed CMOS image sensors. The image data from a set of multiple rows in a color pixel array is concurrently readout. Concurrently reading out the image data from the set of multiple rows includes concurrently selecting a first portion of the image data by first readout circuitry and a second portion of the image data by second readout circuitry. The first and second portions of the image data from the set of multiple rows are different and the first and second readout circuitries are also different.

The way of operating these image sensors is usually incompatible with a global shutter function, although a global shutter function is known to overcome undesirable imaging artifacts such as skewing and partial exposure that are caused by the rolling shutter. However, a global shutter exposes all the pixels of the imaging device simultaneously. Therefore, pixel rows cannot be selected for readout whilst control signals relating to the global shutter are being applied. A solution to this is to apply the conflicting global shutter control signals during a vertical blanking time. But this limits the achievable frame rate of the imaging device. It is therefore desirable to provide image sensors that have a reduced or zero vertical blanking time but cause less imaging artifacts than conventional rolling shutter devices.

SUMMARY OF THE INVENTION

It is an object of embodiments of the present invention to provide image sensors and related imaging method that have a reduced or zero vertical blanking time but cause less imaging artifacts than conventional rolling shutter devices.

The above objective is accomplished by a method and device according to the present invention.

A solid-sate image sensor according to embodiments of the present invention includes a pixel array, the pixels of which are arranged in a plurality of pixel rows and a plurality of pixel columns, and a row control unit. The row control unit is configured for operating the image sensor in a quasi-global electronic shutter mode, by: (i) determining exceptional pixel rows for which a global exposure control pulse, to be applied simultaneously to all pixel rows of the pixel array, would fully or partially coincide with a sequentially applied readout control pulse selecting a number of pixel rows of the pixel array to be read out, (ii) simultaneously applying said global exposure control pulse to all but the exceptional pixel rows, and (iii) applying delayed and/or advanced versions of the global exposure control pulse to the exceptional pixel rows.

The solid-state image sensor may be part of a camera system, which also contains image-forming optics.

A method of operating a solid-state image sensor in a quasi-global electronic shutter mode in accordance with embodiments of the present invention comprises: (i) determining exceptional pixel rows for which one or more pre-scheduled global exposure control pulses, to be applied simultaneously to all pixel rows of a pixel array of the image sensor, would fully or partially coincide with sequentially applied readout control pulses selecting individual pixel rows or groups of pixel rows of the pixel array to be read out, (ii) simultaneously applying said one or more pre-scheduled global exposure control pulses to all but the exceptional pixel rows, (iii) generating re-scheduled exposure control pulses as delayed and/or advanced versions of the one or more pre-scheduled global exposure control pulses, and (iv) applying the re-scheduled exposure control pulses to the exceptional pixel rows.

It is and advantage of embodiments of the invention that the pixel array of an image sensor can be read out continuously and without dead time.

According to some embodiments of the invention, more than one pixel row is concurrently selected for read out.

According to some embodiments of the invention, pixel rows or groups of pixel rows are successively selected in phases. Upon selection of a pixel row or group of pixel rows, a phase delay is being applied. The phase delay between successively selected pixel rows or groups of pixel rows is shorter than one row selection period.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF DRAWINGS

The invention will now be described further, by way of example, with reference to the accompanying drawings, in which.

Figure 1:
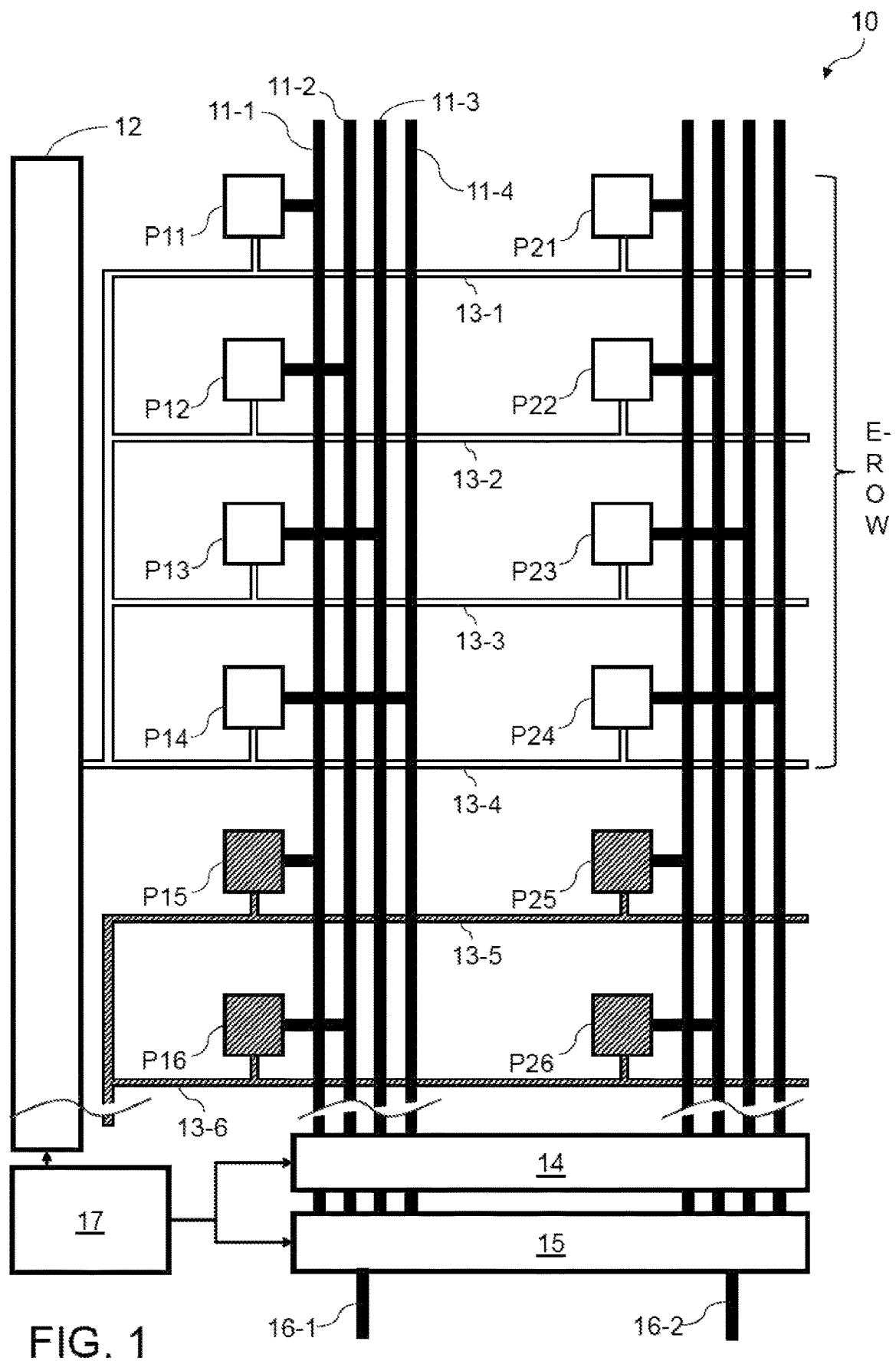
FIG. 1 is a block diagram showing the configuration of a portion of a solid-state image sensor according to an embodiment of the invention.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF THE INVENTION

The present invention will be described with respect to particular embodiments and with reference to certain drawings, but the invention is not limited thereto but only by the claims.

Directional terminology such as top, bottom, front, back, leading, trailing, under, over and the like in the description and the claims is used for descriptive purposes with reference to the orientation of the drawings being described, and not necessarily for describing relative positions. Because components of embodiments of the present invention can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

When the description refers to row time, row scanning period or row selection period, these terms are used interchangeably. Likewise, the wording pixel and pixel unit are used interchangeably.

An electrical row, in the context of the present invention, refers to a set of pixel rows with respect to which control signals are asserted collectively, in unison, instead of independently. This may be achieved in practice, for instance, by logically or physically combining the word lines corresponding to this set of pixel rows.

FIG. 1 is a block diagram that shows the configuration of a portion of a solid-state image sensor 10 according to a first embodiment of the invention. The image sensor 10 comprises a pixel array, a plurality of word lines, and a plurality of column lines. Although only a portion of the image sensor 10 containing twelve pixels twelve is shown for clarity, the complete pixel array would typically contain thousands of pixel rows and pixel columns. The pixel units of the array are logically organized into pixel columns and pixel rows. For instance, pixel units P11 to P16 are arranged in a first pixel column and pixel units P21 to P26 are arranged in a second pixel column, adjacent to the first pixel column, and so forth. Pixel units of a same pixel row share a common word line. Each word line acts as a control path over which control signals such as row select signals, reset signals, and charge transfer signals are supplied to the pixel units of the pixel row that is associated with the word line. The word lines may each contain several control wires. For instance, pixel units P11, P21, etc. of a first pixel row are connected to word line 13-1. Pixel units P12, P22, etc. of a second pixel row are connected to word line 13-2. Pixel units P13, P23, etc. of a third pixel row are connected to word line 13-3. Pixel units P14, P24, etc. of a fourth pixel row are connected to word line 13-4, and so forth. In addition thereto, sets of word lines are interconnected to form a word line bundle so that the same control signal can be applied in parallel to each word line of the bundle. The pixel rows that are controlled by a same word line bundle are also referred to as an electrical pixel row, electrical row or "E-ROW". Hence, when reading out the pixel array, the pixel units of one and the same electrical pixel row are all asserted during the same row scanning period, e.g., the row time interval. For instance, the word lines 13-1 to 13-4 corresponding to four successive pixel rows in the array may be interconnected to obtain one electrical pixel row. Word lines 13-5 and 13-6 are part of the next bundle of four interconnected word lines that correspond to another one electrical pixel row. Although electrical rows of the present embodiment each contain four adjacent pixel rows of the array, electrical rows may contain a different number of pixel rows in other embodiments of the invention and the pixel rows associated with a same electrical row do not necessarily have to be adjacent pixel rows of the array. Tens or hundreds of pixel rows may be assigned to a same electrical row and read out in parallel during the same row scanning period. In the extreme case of having electrical rows consisting of only one pixel row, pixel rows are addressed individually during readout and there is no row parallelism. Row parallelism during readout of the pixel array is desirable since it offers the benefit of moderate or low readout noise at increased frame rates.

A row driver unit 12 is provided to generate the control signals that are applied to the word lines of each electrical row. Global control signals are applied to all the word lines simultaneously. Quasi-global control signals are applied simultaneously to the majority of word lines, but not all the word lines. Some exceptional word lines not receiving the quasi-global control signal, and the electrical pixel rows associated therewith, are determined in advance. The row driver unit 12 is also configured to apply pulses of control signals pertaining to the readout of the pixel array in a rolling operation, meaning that electrical rows are selected in a sequential fashion—one at the time and per row time—for readout.

Pixel units of a same pixel column share a common set of column lines, also referred to as column wires or bit lines. The column lines of each pixel column may be arranged into a common column bus. More specifically, the pixel units of an electrical row that are located in the same pixel column are operatively connectible to respective column lines of the set of column lines. Hence, there are at least as many column lines as there are pixel rows in each electrical row. By way of example, pixel units P11 to P14 of one of the electrical rows are connectible to respective column lines 11-1 to 11-4. The multiplicity of column lines associated with each pixel column enables the concurrent selection of several pixel rows for readout so that readout signals from the concurrently selected pixel rows are applied to different column lines.

Column line readout circuitry 14 is coupled to the plurality of column lines at one side (e.g., bottom side) or both sides (e.g., bottom and top side) of the pixel array. The column line readout circuitry 14 is configured to sample, hold and digitize readout signals on the column lines. In the context of correlated double sampling (CDS), readout signals include a pixel signal, which is representative of a pixel unit's photocharge generated during exposure, and a reference signal representative of a pixel unit's residual charge after reset.

In some embodiments of the invention, the column line readout circuitry comprises a readout block in respect of each pixel column. In other embodiments of the invention, a readout block is shared by the column lines associated with a plurality of pixel columns, e.g., using multiplexing. A typical readout block may comprise line select switches, a sample-and-hold stage, an A/D conversion stage, and a buffer stage.

The image sensor 10 further includes multiplexing circuitry 15 for combining the output signals from the column line readout circuitry 14 into one or more output channels 16-1, 16-2. The multiplexing circuitry 15 may include a hierarchical multiplexing structure, e.g., cascaded multiplexers, wherein each level of the hierarchy operates at an increased clock speed which is a multiple of the clock speed of the preceding level. In a 1024*1024 pixel array, for example, an electrical row consisting of 128 pixel rows may be read out sequentially with a row scanning period (row time) of 1.25 µs. In this example, the hierarchical multiplexing structure may comprise three multiplexing stages/levels. In the first multiplexing stage of the hierarchical multiplexing structure the outputs of the 131072 column readout circuits are multiplexed onto 8192 wires operating at 12.8 MHz. This is followed by the second multiplexing stage in which the 8192 wire signals are multiplexed onto 1024 concentrators capable of running data at 102.4 MHz. Eventually, the 1024 concentrators are multiplexed onto 128 output channels (channel speed 819.2 MHZ) in the third multiplexing stage.

A clock tree may be implemented in the higher levels of the hierarchical multiplexing structure to ensure accurate timing of the multiplexer structure at elevated clock speeds. Slower clock signals, e.g., in the lower levels of the hierarchical multiplexing structure, may be provided from the periphery. Accordingly, control pulses generated by a slower clock may be substantially block-shaped (e.g., rectangular shape or trapezoidal shape), whereas control pulses generated by faster clocks may be half sine waves.

A control circuit 17 of the image sensor 10 is connected to the row driver unit 12, the column line readout circuitry 14, and the multiplexing circuitry 15. The control unit 17 may be configured to perform various tasks such as synchronization between the row driver unit 12 and the column line readout and multiplexing circuitry 14, 15, the transmission of row address signals, global or quasi-global control sequences to the row driver unit 12, etc. The sending of row address signals may not be required if the row driver unit 12 comprises a sequencing sub-unit, e.g., a hardwired or programmable sequencing structure. The row driver unit 12 on its own or in combination with the control circuit 17 acts as a row control unit.

Figure 2:
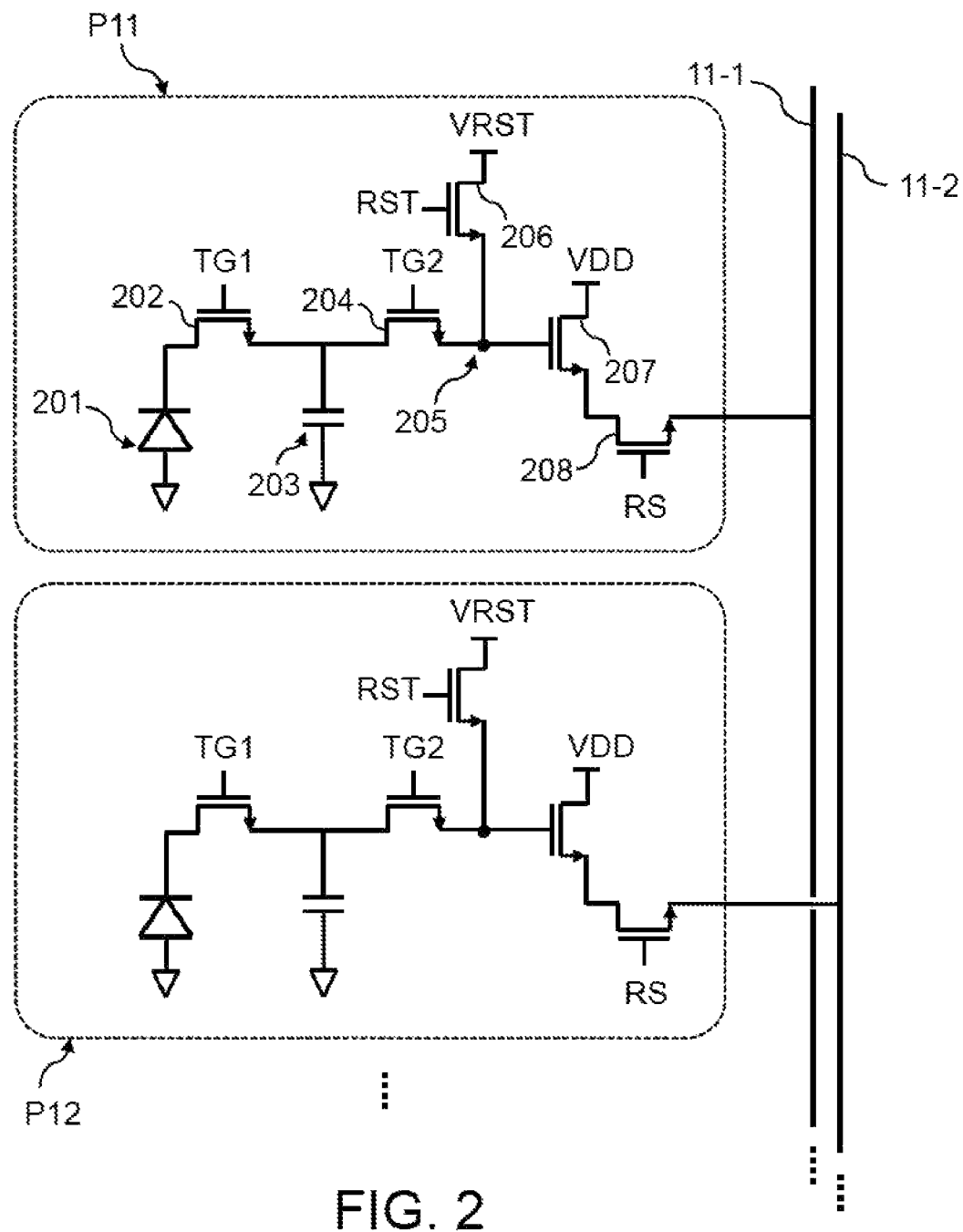
FIG. 2 shows the configuration of individual pixel units of an image sensor that can be used in embodiments of the invention.

FIG. 2 shows the configuration of individual pixel units of the image sensor that can be used in embodiments of the invention. Each pixel unit comprises a first and a second charge transfer transistor 202, 204 connected in series between a photodiode 201 and a floating diffusion node 205. The floating diffusion node 205 provides a potential well for the photocharge that is generated by each pixel unit's photodiode (after transfer). Collecting a charge on the floating diffusion node 205 induces a change in voltage associated with the floating diffusion node 205 as long as it is in the floating state. A reset transistor 206 is connected between a reset voltage source VRST and the floating diffusion node 205 to operatively connect the floating diffusion node 205 to the reset voltage source VRST when a reset signal RST is supplied to the control gate terminal of the reset transistor 206. A source follower transistor 207 has its control gate terminal connected to the floating diffusion node 205 and is configured to generate an output voltage change at its source terminal that is proportional or approximately proportional to the induced voltage change associated with the floating diffusion node 205. The two adjacent pixel units P11 and P12 are operatively connectible to two different column lines 11-1 and 11-2 via respective row select transistors. When a row select signal RS is supplied to the control gate terminal of the row select transistor 208, an output signal from the source follower transistor 207 is applied to the column line 11-1. The column lines 11-1 and 11-2 are associated with the pixel column in which the adjacent pixel units P11 and P12 are arranged.

Upon application of a first charge transfer signal TG1 to the control gate terminal of the first charge transfer transistor 202, the first charge transfer transistor 202 is switched on and a photocharge generated by the photodiode 201 is transferred onto a capacitive storage element 203, which functions as a memory element in the charge domain. In some embodiments of the invention, a separate hold transistor may be used to temporarily store the generated photocharge when exposure of the photodiode has ended. The first charge transfer transistor 202 is then switched off and the transferred photocharge remains temporarily stored on the capacitive storage element 203. If a second charge transfer signal TG2 is applied to the control gate terminal of the second charge transfer transistor 204, the second charge transfer transistor 204 is switched on and the temporarily stored photocharge is transferred from the capacitive storage element 203 to the floating diffusion node 205. The second charge transfer transistor 204 is then switched off and the transferred photocharge remains temporarily stored on the floating diffusion node 205.

Prior to transferring the photocharge to the floating diffusion node 205, any remaining signal charge is removed from the floating diffusion node 205 by switching on the reset transistor 206, whereby the floating diffusion node 205 is effectively brought to the voltage level of the reset voltage source VRST. This can be followed by a reference measurement during which the source follower transistor 207 converts a residual charge on the floating diffusion node 205 into a reference signal which is then applied to the column line 11-1. After having completed the photocharge transfer onto the floating diffusion node 205, a readout measurement is performed: the source follower transistor 207 converts the photocharge on the floating diffusion node 205 into a pixel signal which is then applied to the column line 11-1.

The above-described pixel unit is suitable for global or quasi-global shutter operation of the image sensor. To implement an electronic global or electronic quasi-global shutter, the exposure intervals of the pixel units in all the pixel rows or the vast majority of pixel rows have to be synchronized. The exposure of the pixel units starts when their respective photodiodes 201 have been reset. This can be achieved by switching on the reset transistor 206, which couples the floating diffusion node 205 to the reset voltage source VRST, and opening the first and second charge transfer transistors 202, 204 at the same time, thereby coupling the photodiode 201 to the reset voltage on the floating diffusion node 205. The exposure interval starts when the first charge transfer transistor 202 is switch off again. In alternative embodiments of the invention, a distinct reset transistor may be provided for the purpose of resetting the photodiode. When the exposure interval is about to end, a first charge transfer signal TG1 is supplied to the control gate terminals of the pixel unit's first charge transfer transistors 202. This ensures that the photocharge that is generated during exposure is moved out of the photodiode 201 and collected on the storage element 203.

In global shutter mode, a readout sequence of the output signals from the source follower transistors 207 can only start once the generated photocharge of all the pixel units in the array has been transferred from the photodiode 201 onto the respective storage elements 203. This delays the moment the readout sequence, e.g., sequential readout of the pixel rows, can be initiated and limits the achievable frame rate of the image sensor. Therefore, conventional global shutter function of image sensors requires a vertical blanking time during which one or more global exposure control pulses are applied to the pixel rows of the pixel array, thereby interrupting the rolling readout operation between two image frames (dead time). It is impossible to start the readout sequence earlier in the global shutter mode of the image sensor, because conflicting control signals would be applied to the pixel units of two or more pixel rows: asserting a first charge transfer signal "TG1" on one or more pixel rows while the photocharge transfer from the storage element 203 to the floating diffusion node 205 has not yet been completed during readout selection of these rows, e.g. while the second charge transfer signal "TG2" is still asserted on the word lines that are associated with the selected pixel rows, would lead to instabilities in the readout signals and disturb the readout process. This is however not the case when the image sensor is operated in the quasi-global shutter mode, as will now be explained.

Figure 3:
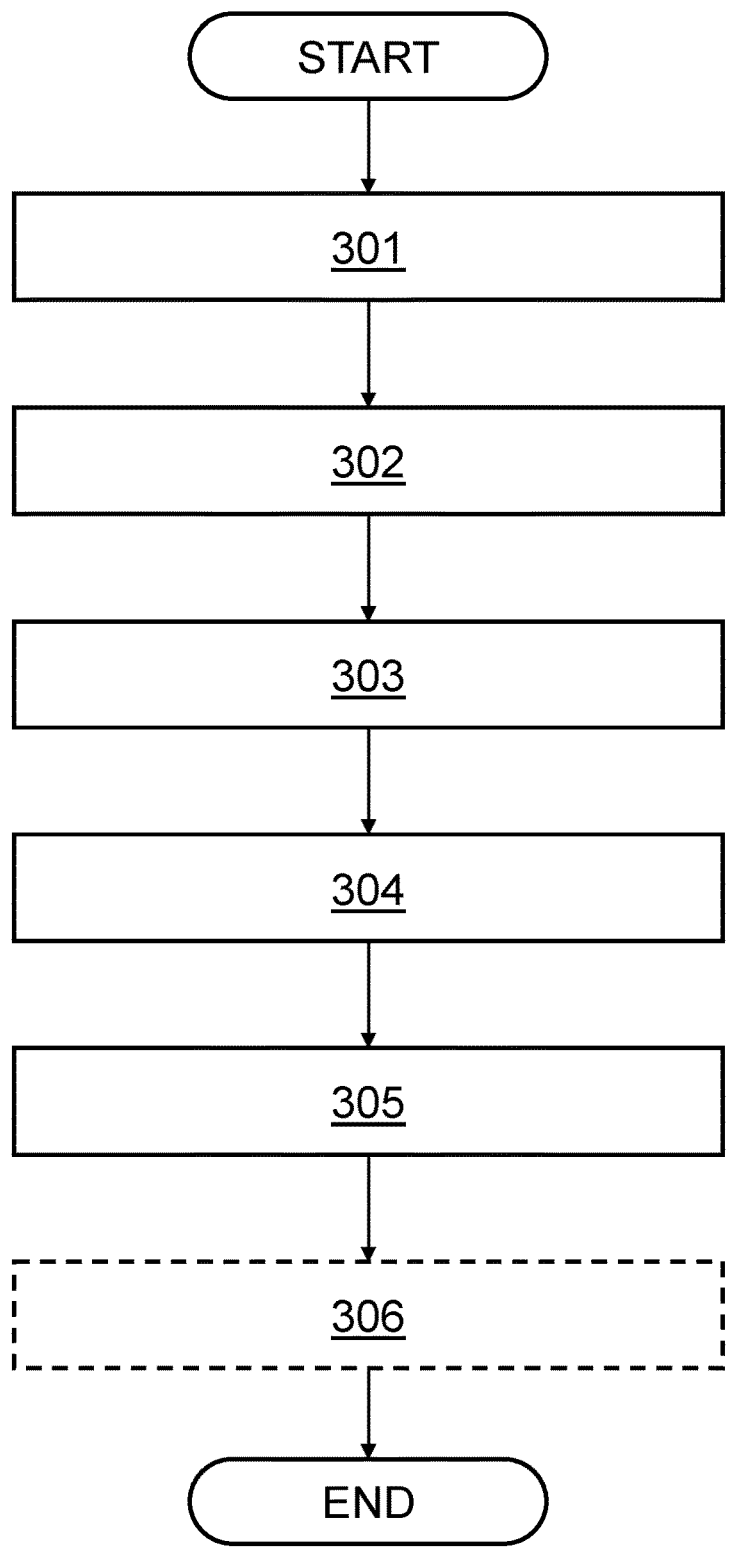
FIG. 3 is a flowchart explaining the quasi-global shutter operation of an image sensor, in accordance with embodiments of the invention.

FIG. 3 is a flowchart explaining how to operate the image sensor according to the quasi-global shutter mode. A quasi-global shutter is achieved if the vast majority of pixel units of pixel array is subjected to a global shutter control sequence and only the pixel units of a few exceptional pixel rows are not perfectly synchronized with the global shutter control sequence, e.g., 10% of all pixel rows or less, e.g., 1% of all pixel rows. This leads to slightly longer or slightly shorter exposure times for the pixel units in the exceptional rows. In return, the image sensor is capable of streaming out frame data permanently and without interruption in the quasi-global shutter mode. In contrast to the conventional global shutter mode, the quasi-global shutter does not require the allocation of an additional time slot, e.g., one extra row time interval, between two row scans and can operate at the same frame rate as the rolling shutter mode.

To start with, the planned timing of one or more global exposure control pulses—to be applied to the entire pixel array—is compared to the planned timing of a sequence of readout control pulses in step 301 and readout control pulses that are concurrent with at least one of the global exposure control pulses are detected. Here, two control pulses are considered to be concurrent one with another if they coincide fully or partially in time, e.g., if the two control pulses have overlapping portions or are applied simultaneously to the pixel units of a number of pixel rows addressed for readout. In general, the planned timing of the one or more global exposure control pulse is determined by the exposure start time and the user-defined or automatically defined exposure duration. The planned timing of the sequence of readout control pulses preferably is the timing for readout sequences in conventional image sensors, e.g., the timing resulting from a programmed or hardwired word line sequencer.

One kind of global exposure control pulse that is typically being compared in step 301 includes a pulse associated with the first charge transfer signal "TG1" (end of exposure and transfer of the photocharge out of the photodiode), while the sequence of readout control pulses typically includes a sequence of row-wise applicable select pulses "RS", reset pulses "RST" and second charge transfer pulses "TG2" (photocharge transfer onto the floating diffusion node). Only the planned, e.g., pre-scheduled, timings are compared, thus avoiding the collision of actually applied control signals in the subsequent steps.

Exceptional pixel rows are then determined in step 302 as those pixel rows for which a coincidence between the planned timings of the one or more global exposure control pulses and the sequence of readout control pulses has been detected. In the following step 303, the one or more global exposure control pulses are re-timed for the exceptional pixel rows determined in step 302. Re-timing of global exposure control pulses includes delaying and/or advancing the global exposure control pulses, or a copy thereof, in time. The re-timed or re-scheduled exposure control pulses thus deviate from the initially planned timing. A re-scheduled exposure control pulse does not collide, e.g., coincide fully or partially, with a row-sequential readout selection pulse that is applied in a rolling fashion.

The one or more global exposure control pulses are applied simultaneously to all but the exceptional pixel rows in step 304, e.g., in accordance with the planned timing thereof, and re-timed global exposure control pulses are applied to the exceptional pixel rows in step 305. Depending on whether the re-timed global exposure control pulses are all delayed or all advanced with respect to the initial, planned timing, the temporal order of steps 304 and 305 may be inverted.

By way of example, instead of applying a global exposure control pulse (e.g. the first charge transfer pulse "TG1") corresponding to a current image frame during a vertical frame blanking time interval, it can be pre-scheduled as a quasi-global exposure control pulse at the end of the rolling readout operation associated with the preceding image frame, e.g. during the time the last row at the bottom of the pixel array is selected for readout. In this case, the last pixel row of the pixel array is determined as an exceptional row in respect of which the pre-scheduled global exposure control pulse (e.g., the first charge transfer pulse "TG1") needs to be re-scheduled. This can be achieved by delaying the pre-scheduled global exposure control pulse, or a copy thereof, by at least one row selection time with regard to the exceptional row. The delayed exposure control pulse (e.g., "TG1") is then applied to the last pixel row at the same time the first pixel row, e.g., the pixel row at the top of the pixel array, is selected for readout of the current image frame.

In a variant of the previous example, the quasi-global exposure control pulse is pre-scheduled at the beginning of the rolling readout operation associated with the current image frame, e.g., during the time the first row at the top of the pixel array is selected for readout. Therefore, the first pixel row of the pixel array is determined as an exceptional row in respect of which the pre-scheduled global exposure control pulse (e.g., the first charge transfer pulse "TG1") needs to be re-scheduled. This can be achieved by advancing the pre-scheduled global exposure control pulse, or a copy thereof, by at least one row selection time with regard to the exceptional row. The advanced exposure control pulse (e.g., "TG1") is then applied to the first pixel row at the same time the last pixel row at the bottom of the pixel array is selected for readout of the image frame that precedes the current image frame.

In particular embodiments of the invention, only some but not all of the re-timed global exposure control pulses (e.g., a subset of the re-timed global exposure control pulses) are delayed with respect to the initial timing, whereas all the remaining re-timed global exposure control pulses are advanced. This leads to more flexibility in the re-timing process of the global exposure control pulses to be applied to the exceptional pixel rows. In such cases, execution of the steps 304 and 305 is not sequential (interlaced application of the initially timed and re-timed global exposure control pulses).

Each readout control pulse of the sequence of readout control pulses can be applied to the pixel units of the corresponding pixel row in step 306, subsequent to the application of respective global exposure control pulse (initially timed or re-timed) to the pixel units in that pixel row.

In some embodiments of the invention, the exceptional rows may correspond to one or more individual pixel rows of the pixel array. In other embodiments, the exceptional rows may correspond to one or more concurrently addressed groups of pixel rows, e.g., an electrical row ("E-ROWS) in which a common control signal is applied to the word lines of a group of pixel rows. The exceptional rows may be located at the upper and/or lower boundary of the pixel array.

In embodiments of the invention, the row driver unit or control unit of the image sensor may be configured to perform the steps 301-306 above. For instance, the row driver or control unit may comprise a hardwired or programmable sequencer as sub-unit. Alternatively, external control may be used to determine the exceptional pixel rows and communicate the resulting row addresses or address space to the row driver unit or control unit of the image sensor.

In particular embodiments of the invention, the readout signals obtained in respect of the exceptional rows are discarded, which effectively restores global shutter operation for a slightly smaller pixel array.

In other embodiments of the invention, the readout signals obtained in respect of the exceptional rows are corrected by a factor that accounts for the difference in exposure times. Additionally or alternatively, the corrected readout signals in respect of the exceptional rows can be combined with the readout signals obtained in respect of pixel rows that are spatially close to the exceptional rows, e.g., adjacent to or interleaved with the exceptional rows. Combining may include determining a weighted average of readout signals obtained in respect of the exceptional rows and the non-exceptional pixel rows. The combination of readout signals may then be used to replace the originally obtained readout signals from the exceptional rows.

In yet other embodiments of the invention, the light receiving surface of the image sensor is rendered opaque in respect of the exceptional rows and the readout signals obtained from these rows are used for a purpose other than image formation. For instance, readout signals obtained from these rows can be used for dark current measurements, whereas the vast majority of pixel rows still contributes to the image formation. This way, the pixel units in the exceptional rows are not wasted but can give additional insight into the operating conditions (e.g., temperature, leakage currents) that prevailed during the image forming process. The additional information may be used to correct the acquired image, e.g., image pattern noise removal such as dark signal non-uniformity noise cancellation.

Figure 4:
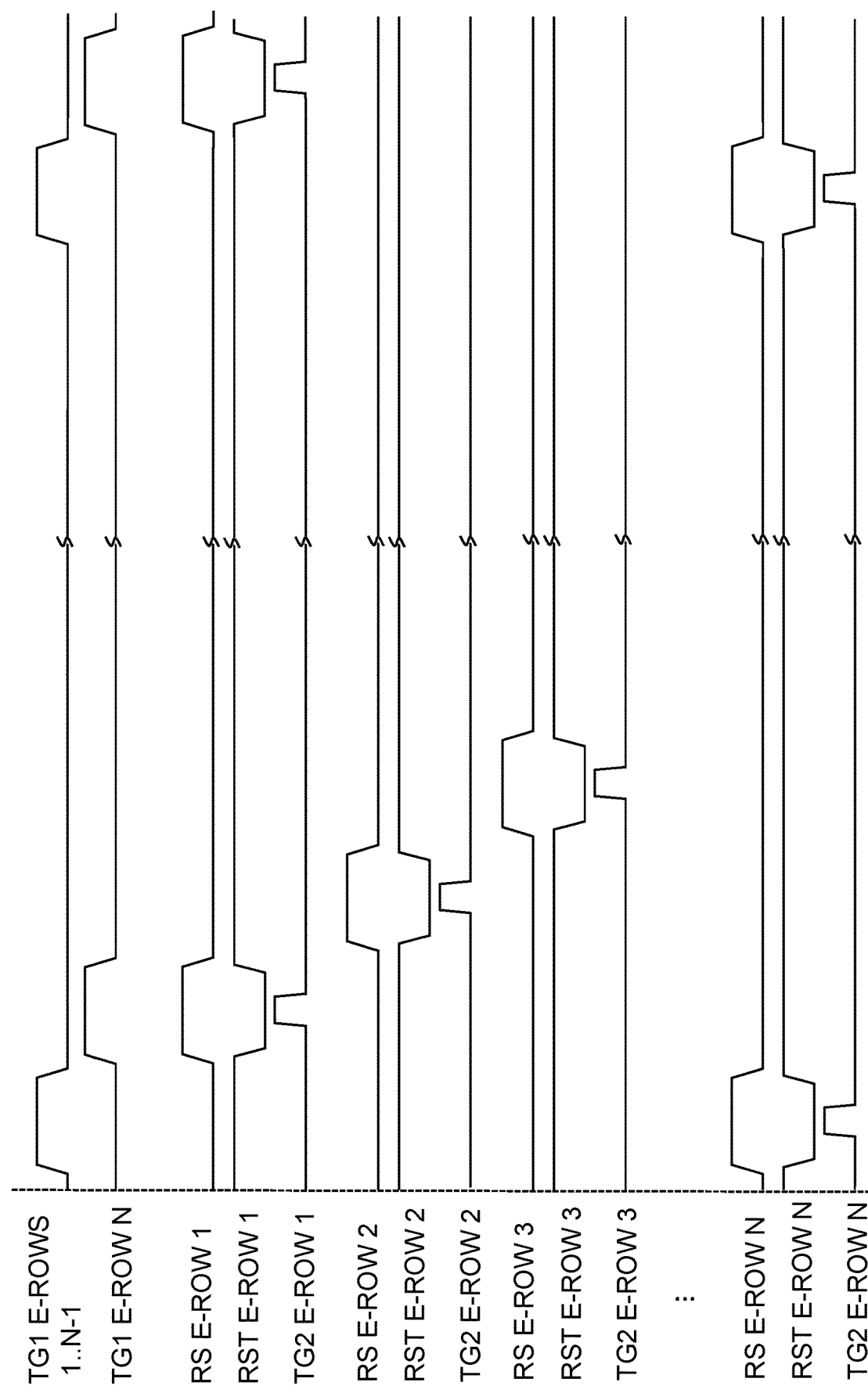
FIG. 4 is a timing diagram illustrating control signals issued by an image sensor that is operated in the quasi-global shutter mode, in accordance with embodiments of the invention.

FIG. 4 is a timing diagram for control signals issued according to the quasi-global shutter mode of an exemplary image sensor comprising N electrical rows ("E-ROWS 1 . . . N"). Commonly commercialized image sensors may comprise hundreds of electrical rows. In the present embodiment, ordinarily timed quasi-global first charge transfer pulse TG1—marking the end of the exposure period—would be coincident with the second charge transfer pulse TG2 of the readout control sequence acting on the $N^{th}$ electrical row. Therefore, the $N^{th}$ electrical row is identified as an exceptional electrical row (i.e., group of concurrently addressed pixel rows) in respect of which the first charge transfer pulse "TG1" has to be re-timed. Here, the re-timing of the first charge transfer pulse "TG1" in respect of the $N^{th}$ electrical row consists of delaying first charge transfer pulse "TG1" for this particular electrical row. As the delayed charge transfer pulse "TG1" only acts on the $N^{th}$ electrical row, there is no interference with readout control signal pulses (e.g., "RS", "RST", "TG2") acting on the $1^{st}$ electrical row. As a result, conflicts between control signal pulses ascribed to the global shutter operation of the image sensor and control signal pulses ascribed to the rolling operation of the image sensor during readout are avoided.

At the end of the exposure period, an ordinarily timed quasi-global first charge transfer pulse "TG1" is thus applied simultaneously to the N−1 non-exceptional electrical rows "E-ROW 1" to "E-ROW N−1" (global operation acting on all the electrical rows of the pixel array that not exceptional electrical rows), while a re-timed first charge transfer pulse "TG1" is delayed by one row time and solely applied to the exceptional electrical row "E-ROW N". The control pulses associated with the readout operation, e.g. row select "RS", disable resetting of the floating diffusion nodes "RST" and the subsequent transfer of the photocharge onto the floating diffusion node "TG2", are then applied sequentially, according to a rolling (readout) operation of the image sensor: stepping from one electrical row to the next one at time intervals of one row time.

Although not represented in the present embodiment, exceptional pixel rows may contain more than just one single electrical row, e.g., one or more electrical rows on either or both sides of the pixel array. Exceptional pixel rows may contain one or more individual pixel rows on either or both sides of the pixel array in embodiments which do not provide for electrical rows.

Figure 5:
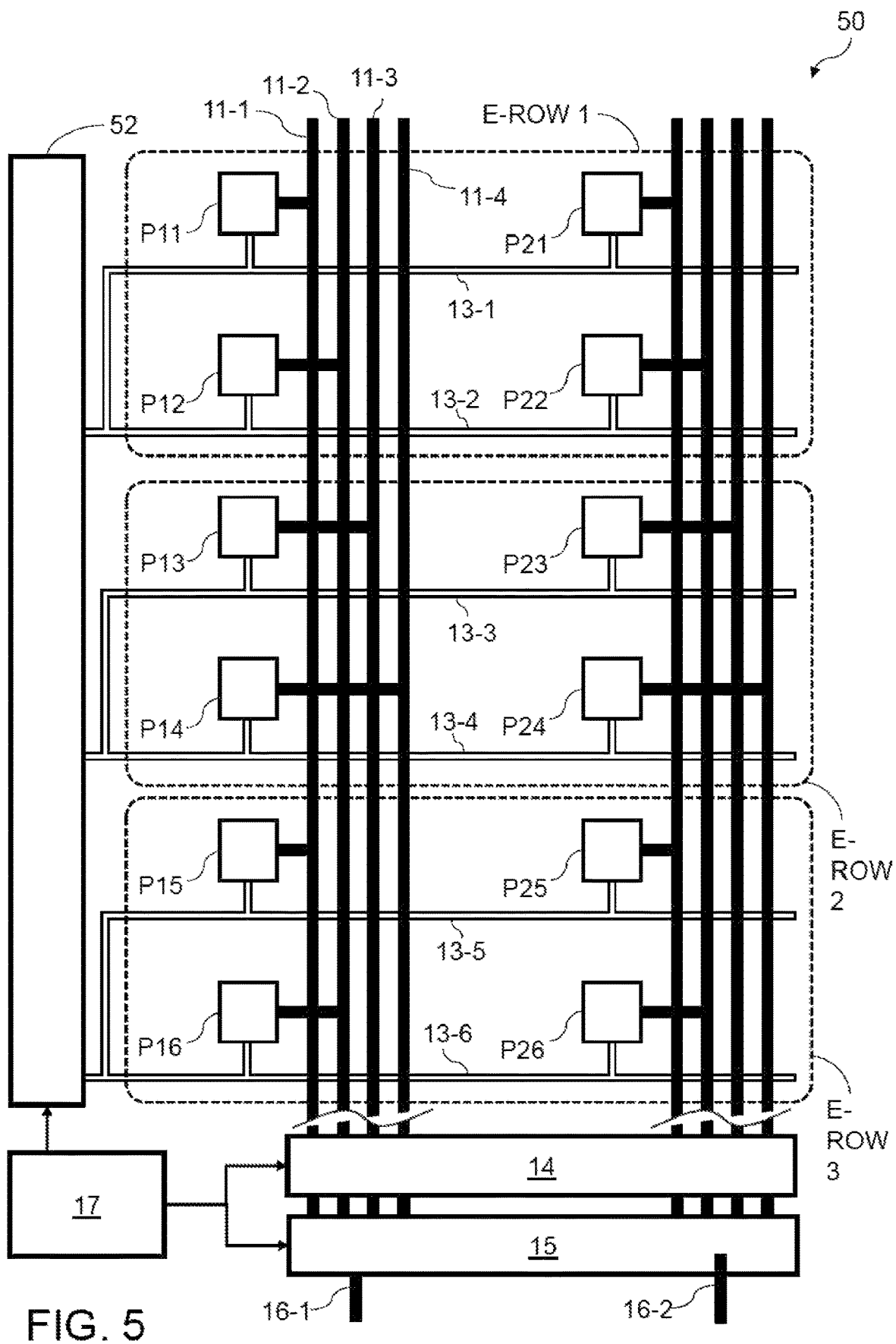
FIG. 5 is a block diagram showing the configuration of a portion of a solid-state image sensor according to another embodiment of the invention.

A variant of the first embodiment is now described with reference to FIG. 5, which shows the configuration of a portion of a different solid-state image sensor 50. Image sensor 50 differs from the image sensor of FIG. 1 in that each electrical row "E-ROW 1", "E-ROW 2" and "E-ROW 3" now contains only half as many pixel rows as the electrical row of the embodiment referred to in FIG. 1. The row driver unit 52 is configured similarly to the row driver unit 12 but applies pulses of control signals pertaining to the readout of the pixel array according to a modified rolling operation: phased row scanning. The phased row scanning approach to reading out the pixel array implies that successive electrical rows are selected in phases so that multiple electrical rows are asserted simultaneously but with different delays with respect to each other. This delay between subsequent phases is less than the row scanning period (row time) such that the current phase has not yet terminated when the next phase starts, and every row scanning period encompasses two or more phases. Moreover, the delay between subsequent phases is usually less than the duration of readout signal pulses that control the selection of electrical rows, e.g., row select pulses to control the selection of all the pixel units comprised in the different electrical rows, which causes the readout signal pulses associated with the selection of different consecutive electrical rows to partially overlap in time. By way of example, there is a moment in time when two, three or four row select pulses related to two, three or four electrical rows are asserted if two, three or four signal phases are used in the course of one row time. It also follows that readout signals originating from the successively selected electrical rows are applied in partially overlapping phases to the different column lines, whereas readout signals that originate from the same electrical row are applied fully in parallel (e.g., identical phase, completely overlapping) to the different column lines. Insofar as the image sensor 50 is concerned, the first two column lines 11-1 and 11-2 of the first pixel column allow the parallel readout of pixel units P11 and P12 as part of the same electrical row "E-ROW 1" and the other two column lines 11-3 and 11-4 of the first pixel column allow the parallel readout of pixel units P13 and P14 as part of the differently phased (e.g. phase angle of 180°) electrical row "E-ROW 2". Therefore, one part of the plurality of column lines that is associated with each pixel column enables the row parallelism during the readout of an electrical row, while the other part of the plurality of column lines allows conveying the different readout signal phases stemming from different electrical rows. In embodiments of the invention, the column line readout circuit preferably implements the same phases for its control signals as are used for the readout of the electrical rows, e.g., corresponding phase angles for the signals controlling the column line pre-charging and the sample-and-hold stages.

As readout signals related to electrical rows with different phase delays/phase angles become progressively available at the column line readout circuitry 14, the number of sample-and-hold stages therein may be reduced, e.g. one sample-and-hold stage for signal and reference voltage in CDS instead of two stages, or even eliminated if the readout signals are accessed directly. Using phased row scanning in combination with smaller electrical rows (i.e., counting less pixel rows) has the further advantage that current spikes peaks can be spread out, whereby interference effects and crosstalk are reduced.

In accordance with embodiments of the invention, image sensors that use phased row scanning can be operated in the quasi-global shutter mode, too. For instance, the method steps explained with reference to FIG. 3 can be applied to the image sensor 50 of FIG. 5, whose row driver unit is set up for phased row scanning. Care has to be taken to correctly identify all the exceptional pixel rows in these cases, which is more elaborate due to the multiple participating phases in the readout control signals that can conflict with the pre-scheduled global exposure control signals.

Figure 6:
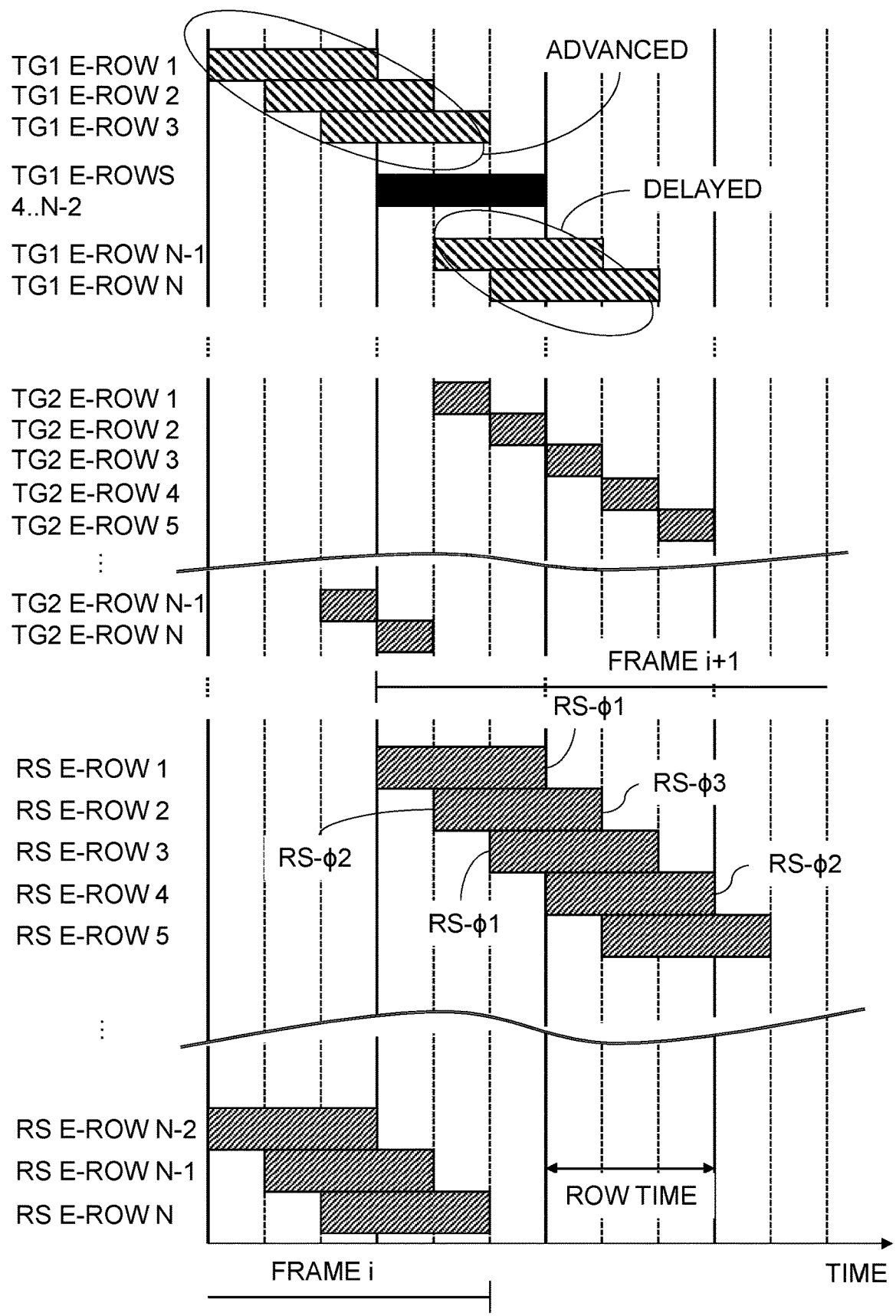
FIG. 6 is a timing diagram illustrating control signals issued by an image sensor that is operated in the quasi-global shutter mode and uses phased row scanning, in accordance with embodiments of the invention.

FIG. 6 is a timing diagram for control signals issued according to the quasi-global shutter mode of an exemplary image sensor comprising N electrical rows, "E-ROWS 1 . . . N", and using three-phased row scanning, viz. each electrical row scanning period ("ROW TIME") accommodates three control signal phases ("RS-φ1", "RS-φ2", "RS-φ3"). The row select pulses in respect of the first three electrical rows "RS E-ROW 1", "RS E-ROW 2" and "RS E-ROW 3" of the current image frame as well as the last two electrical rows "RS E-ROW N−1" and "RS E-ROW N" of the preceding image frame would be fully or partially coincident with the pre-scheduled global exposure control pulse "TG1", thus indicating potential conflicts between global control signals and readout control signals that are applied in rolling operation. Hence, pixel rows comprised by the electrical rows "E-ROWS 1 . . . 3", "E-ROW N–1" and "E-ROW N" are determined as the exceptional rows with respect to which the pre-scheduled global exposure signal "TG1" needs to be re-timed. In the present embodiment, the pre-scheduled global exposure signals "TG1" for the first three electrical rows "E-ROWS 1 . . . 3" are advanced relative to the moment in time where the pre-scheduled exposure control pulse "TG1" is quasi-globally applied to the majority of electrical rows; here electrical rows "E-ROWS 4 . . . N–2". In contrast thereto, the pre-scheduled global exposure signals "TG1" for the last two electrical rows "E-ROW N–1" and "E-ROW N" are delayed relative to the moment in time where the pre-scheduled exposure control pulse "TG1" is quasi-globally applied to the majority of electrical rows.

The timing diagram also shows that the re-schedule global exposure signals pulses "TG1" are applied in phases, in the same way as the control pulses of the corresponding phased readout signals, but with a time offset equal to one row time. This allows an efficient reuse of the existing readout control circuitry, e.g., the row driver unit. This is also desirable in view of the RC delays for driving the global exposure control signal pulses, which are similar to the RC delays related to the driving of the readout control signal pulses.

Although the specific timing diagram of FIG. 6 permits extending the applicability range of the quasi-global first charge transfer pulse "TG1 E-ROWS 4 . . . N–2" to additionally include electrical rows "E-ROW 3" and "E-ROW N–1"—there is no conflict between the "TG2" pulses and the planned global "TG1" pulse—this may not necessarily be the case for other readout control strategies and/or pixel unit architectures that are different than the one illustrated in FIG. 2.

Figure 7:
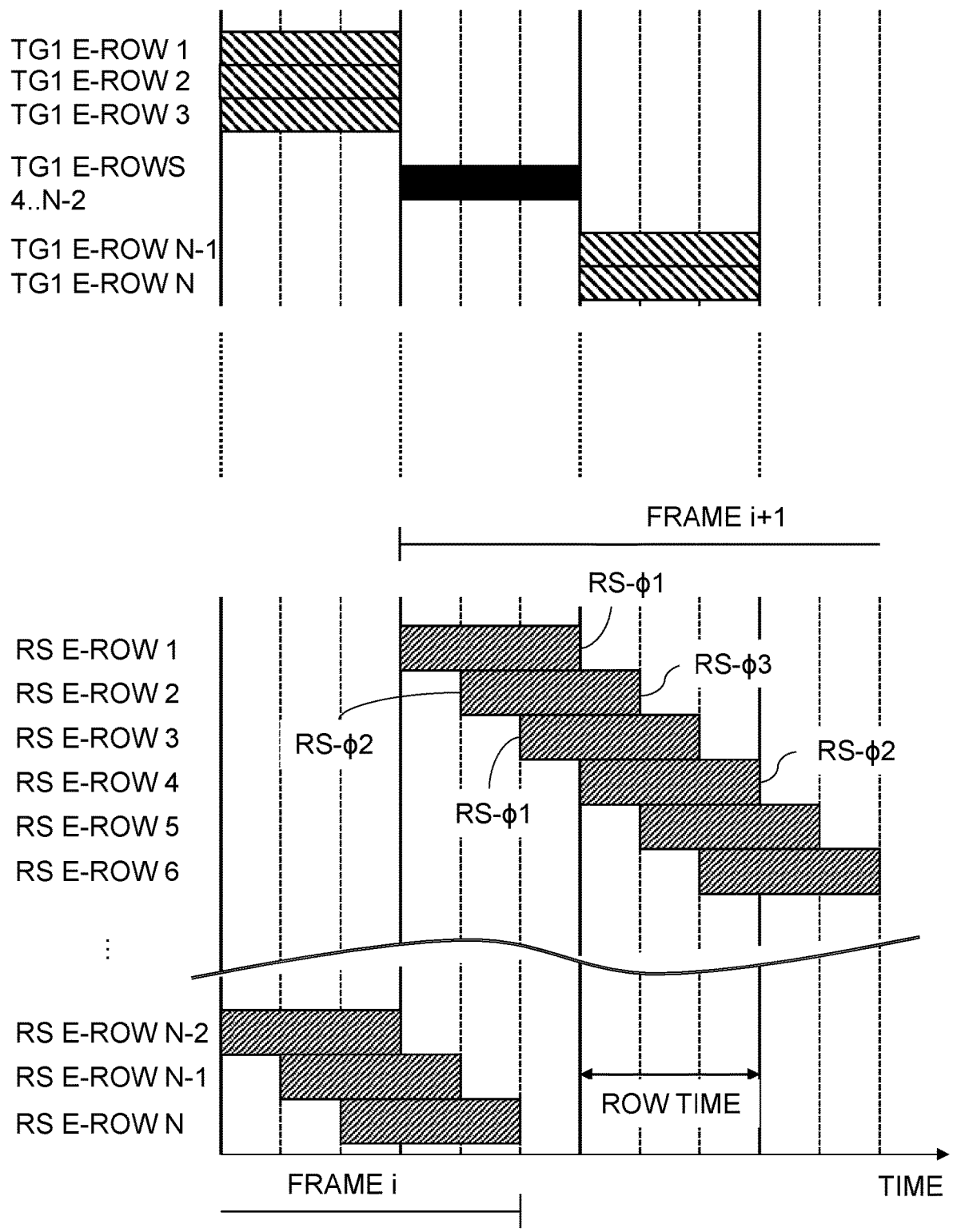
FIG. 7 is a diagram exemplifying an embodiment in which the row-sequential readout selection pulses are applied in phases, but not the re-scheduled exposure control pulses.

It is possible to delay and/or advance the global exposure control pulses corresponding to the exceptional rows in a manner that allows better alignment of the re-timed exposure control pulses and does not require their application in phases. However, the phased application of the delayed and/or advanced global exposure control pulses has the benefit that deviations from the targeted exposure period are minimized with respect to the exceptional pixel rows. An embodiment in which the row-sequential readout selection pulses are applied in phases, but not the re-scheduled exposure control pulses, is shown in FIG. 7.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A solid-state image sensor comprising:
   a pixel array comprising a plurality of pixels arranged in a plurality of pixel rows and a plurality of pixel columns,
   a row control unit configured to operate the image sensor in a quasi-global electronic shutter mode by
   determining exceptional pixel rows for which a global exposure control pulse, to be applied simultaneously to all pixel rows of the pixel array, would coincide with a sequentially applied readout control pulse selecting a number of pixel rows of the pixel array to be read out,
   simultaneously applying said global exposure control pulse to all but the exceptional pixel rows, and
   applying delayed and/or advanced versions of the global exposure control pulse to the exceptional pixel rows,
   wherein the row control unit is further configured to select pixel rows or groups of pixel rows in phases and, upon selection for readout, apply a phase delay, the phase delay between successively selected pixel rows or groups of pixel rows being shorter than one row selection period.

2. The image sensor of claim 1, wherein the global exposure control pulse is a charge transfer pulse applicable to a transfer gate in each pixel of the pixel array.

3. The image sensor of claim 2, wherein the readout control pulse is a row selection pulse for operatively connecting pixels of a same pixel row to respective column lines.

4. The image sensor of claim 1, wherein the row control unit is further configured to apply the readout control pulses sequentially to the pixel rows of the pixel array.

5. The image sensor of claim 1, wherein the row scanning unit is hardwired or programmable.

6. The image sensor of claim 1, wherein said exceptional pixel rows are located at an upper boundary of the pixel array, at a lower boundary of the pixel array, or both.

7. The image sensor of claim 1, wherein the row control unit is further configured to concurrently select groups of pixel rows of the pixel array for readout.

8. The image sensor of claim 1, further comprising a plurality of column lines associated with each pixel column, wherein pixels associated with concurrently or partly concurrently asserted pixel rows are operatively connected to separate ones of the plurality of column lines.

9. The image sensor of claim 8, wherein at least one of a load amplifier, a buffer, and a sample-and-hold stage is included at an end portion of each one of the plurality of column lines.

10. The images sensor of claim 8, further comprising multiplexing circuitry for multiplexing readout signals present on the plurality of column lines associated with each pixel column onto a single output wire for the respective pixel column.

11. The image sensor of claim 1, the row control unit further comprising an input connector for receiving data indicative of said exceptional pixel rows as external input, wherein the row control unit is configured to determine said exceptional pixel rows based on said external input.

12. The image sensor of claim 1, the row control unit further comprising a logic circuit, wherein the logic circuit is configured to receive global exposure control signals and sequential readout control signals and determine the exceptional pixel rows based on the global exposure control signals and sequential readout control signals.

13. A camera system comprising image-forming optics and the image sensor of claim 1.

14. A method of operating a solid-state image sensor in a quasi-global electronic shutter mode, comprising the steps of:
   determining exceptional pixel rows for which one or more pre-scheduled global exposure control pulses, to be applied simultaneously to all pixel rows of a pixel array of the image sensor, would coincide with sequentially applied readout control pulses selecting individual pixel rows or groups of pixel rows of the pixel array to be read out, simultaneously applying said one or more pre-scheduled global exposure control pulses to all but the exceptional pixel rows, generating re-scheduled exposure control pulses as delayed and/or advanced versions of the one or more pre-scheduled global exposure control pulses, and applying the re-scheduled exposure control pulses to the exceptional pixel rows, wherein said sequentially applying the readout control pulse comprises applying successive readout control pulses in phases with a phase delay, the phase delay between successively selected pixel rows or groups of pixel rows being shorter than one row selection period.

15. The method of claim 14, further comprising the step of:
applying the readout control pulse sequentially to the pixel rows or group of pixel rows of the pixel array.

16. The method of claim 14, wherein readout signal from successively selected pixel rows or groups of pixel rows are transmitted over different column wires.

17. The method of claim 16, wherein the readout signals are transmitted either as single-ended signals or as differential signals.

18. The method of claim 16, further comprising the step of:
multiplexing the readout signal transmitted over the different column wires into a number of output channels, the number of output channels being smaller than a number of column wires associated with the pixel array.

* * * * *